US009077996B2

(12) United States Patent
Jagannathan et al.

(10) Patent No.: US 9,077,996 B2
(45) Date of Patent: Jul. 7, 2015

(54) PREDICTED MOTION VECTORS

(75) Inventors: Shyam Jagannathan, Bangalore (IN); Naveen Srinivasamurthy, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 365 days.

(21) Appl. No.: 13/588,245

(22) Filed: Aug. 17, 2012

(65) Prior Publication Data

US 2013/0114721 A1    May 9, 2013

(51) Int. Cl.
*H04N 7/32*    (2006.01)
*H04N 19/433*    (2014.01)

(52) U.S. Cl.
CPC .................................. *H04N 19/433* (2014.11)

(58) Field of Classification Search
CPC .................. H04N 19/00515; H04N 19/00509; H04N 19/433
USPC ..................................................... 375/240.16
See application file for complete search history.

(56) References Cited

U.S. PATENT DOCUMENTS

| 2003/0128762 | A1* | 7/2003 | Nakagawa et al. | 375/240.16 |
| 2004/0091048 | A1* | 5/2004 | Youn | 375/240.16 |
| 2006/0045186 | A1* | 3/2006 | Koto et al. | 375/240.16 |
| 2008/0240242 | A1* | 10/2008 | Lainema | 375/240.16 |
| 2009/0129472 | A1* | 5/2009 | Panusopone et al. | 375/240.16 |
| 2009/0245376 | A1* | 10/2009 | Choi et al. | 375/240.16 |
| 2010/0284464 | A1 | 11/2010 | Nagori et al. | |
| 2011/0194609 | A1* | 8/2011 | Rusert et al. | 375/240.16 |
| 2011/0317762 | A1 | 12/2011 | Sankaran | |
| 2012/0307905 | A1* | 12/2012 | Kim et al. | 375/240.16 |
| 2013/0003849 | A1* | 1/2013 | Chien et al. | 375/240.16 |
| 2013/0070857 | A1* | 3/2013 | Kondo | 375/240.16 |
| 2013/0083853 | A1* | 4/2013 | Coban et al. | 375/240.16 |
| 2013/0279819 | A1* | 10/2013 | Kim et al. | 382/233 |
| 2014/0023144 | A1* | 1/2014 | Park et al. | 375/240.16 |

* cited by examiner

*Primary Examiner* — Jay Patel
*Assistant Examiner* — Francis G Geroleo
(74) *Attorney, Agent, or Firm* — Robert D. Marshall, Jr.; Frank D. Cimino

(57) ABSTRACT

A video encoder includes an entropy encoder that computes a predicted motion vector (PMV) for each of a plurality of macroblocks in a video frame based on motion vectors of multiple other macroblocks. The video encoder also includes a motion estimator that determines a predicted motion vector for a given macroblock by reusing, as the predicted motion vector for the given macroblock, only the PMV computed by the entropy encoder for a macroblock immediately on top of the given macroblock.

6 Claims, 2 Drawing Sheets

PREDICTED MOTION VECTORS

CROSS-REFERENCE TO RELATED APPLICATION

The present application claims priority to India Provisional Patent Application No. 3846/CHE/2011, filed on Nov. 9, 2011; which is hereby incorporated herein by reference.

BACKGROUND

High definition (HD) video comprises numerous macroblocks per frame. For 1080p video, there are 8160 16×16 pixel macroblocks. Thus 8160 macroblocks must be decoded 30 times per second, thereby imposing a significant performance burden on the encoder. Video encoders often are constructed in a pipeline fashion to improve throughput, but additional performance improvements may be desirable.

SUMMARY

The problems noted above are solved in large part by, for example, a video encoder that includes an entropy encoder that computes a predicted motion vector (PMV) for each of a plurality of macroblocks in a video frame based on motion vectors of multiple other macroblocks. The video encoder also includes a motion estimator that determines a predicted motion vector for a given macroblock by reusing, as the predicted motion vector for the given macroblock, only the PMV computed by the entropy encoder for a macroblock immediately on top of the given macroblock.

A method is also disclosed which includes computing, by an encoder, a predicted motion vector (PMV) for each of a plurality of macroblocks in a video frame based on motion vectors of multiple other macroblocks. The method further includes determining, by a motion estimator, a predicted vector for a given macroblock by reusing, as the predicted motion vector for the given macroblock, only the PMV computed by the encoder for a macroblock immediately on top of the given macroblock.

BRIEF DESCRIPTION OF THE DRAWINGS

For a detailed description of exemplary embodiments of the invention, reference will now be made to the accompanying drawings in which.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
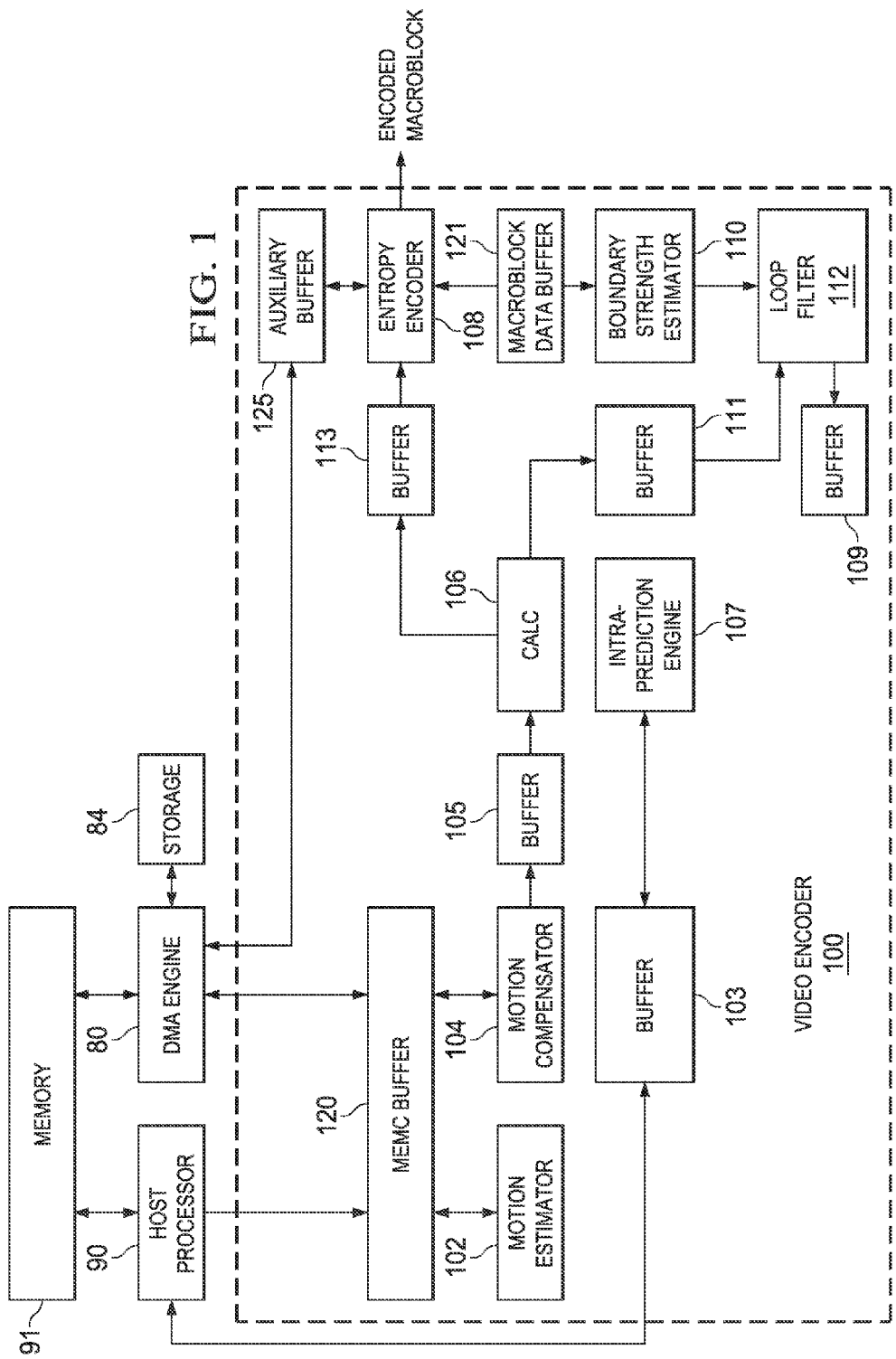
FIG. 1 shows a system including a video encoder in accordance with various embodiments.

FIG. 1 shows a block diagram of a video encoder 100 in accordance with various embodiments. The encoder 100 includes a motion estimator (ME) 102, a motion compensator (MC) 104, a calculation engine (CALC) 106, an intra-prediction engine 107, an entropy encoder 108, a boundary strength estimator 110, and a loop filter 112.

The motion estimator 102 and the motion compensator 104 cooperate to provide macroblock inter-frame predictions (i.e., temporal predictions). The motion estimator 102 searches a previous frame for a matching macroblock to each macroblock in a current frame and generates a motion vector for a given macroblock based on a closest match for the macroblock in a previously encoded frame. The ME 102 writes the motion vector at a common offset in buffer 120 agreed upon by the ME 102 and MC 104. The motion compensator 104 applies the motion vector produced by the motion estimator 102 to the previously encoded frame to generate an estimate of the given macroblock.

The intra-prediction engine 107 analyzes a given macroblock with reference to one or more adjacent macroblocks in the same frame. For example, when encoding a given macroblock, the intra-prediction engine 107 may analyze a macroblock directly above (upper macroblock), a macroblock to the right of the upper macroblock (upper right macroblock), a macroblock to the left of the upper macroblock (upper left macroblock), and a macroblock immediately to the left of the given macroblock (left macroblock) to provide spatial predictions. The intra-prediction engine 107 generates a spatial activity metric which it stores in buffer 103. Based on the analysis, the intra-prediction engine 107 selects one of a plurality of intra-prediction modes for application to the given macroblock.

In addition to the motion vector, the ME 102 generates another metric known as the Sum of Absolute Differences (SAD). The SAD is the sum of the absolute differences between pixels in a current macroblock and corresponding pixels in a reference macroblock. The host processor 90 reads the spatial activity metric generated by the intra-prediction engine 107 via buffer 103 and the SAD generated by the ME 102 and performs a mode decision. In the mode decision, the host processor 90 determines whether the current macroblock is to be encoded using either an intra-block encoding technique or an inter-block encoding technique. After making this mode decision, the host processor 90 programs the CALC engine 106 and the entropy encoder 108 to encode each macroblock in accordance with the mode decision made for the macroblock.

In accordance with at least some embodiments of the invention, the intra mode is fixed at 16×16 (one of the four 16×16 modes per the H.264 standard) so that the intra-prediction engine 107 does not have to spend cycles to decide the mode. Further, the intra-prediction engine 107 preferably is programmed to provide a measure of spatial activity of the current block which is used to compare against a SAD of the motion compensated block.

If the mode decision made by the host processor 90 is to inter-block encode a given macroblock, the CALC engine 106 reads interpolated (or motion compensated luminance and chrominance values from a buffer 105 shared between the MC 104 and CALC engine 106. The CALC engine 106 is given a copy of the current macroblock (also referred as the "original" macroblock) by the host processor 90 using the DMA engine 80. The CALC engine 106 takes the difference between motion compensated pixels and current pixels to produce residuals. The residuals will be transformed, quantized, and saved to a buffer 113 shared between the CALC engine 106 and the entropy encoder 108. As quantization is a lossy process (i.e., the precision of the transformed coefficients will be lost when inverse quantization is applied), the CALC engine will produce a reconstructed set of pixels by performing inverse quantization and inverse transformation. The CALC engine 106 will then save the reconstructed pixels in a buffer 111 shared between the CALC engine 106 and the loop filer 112. The reconstructed pixels will be filtered by the loop filter 112 based on the boundary strengths provided by the boundary strength estimator 110. The loop filter 112 saves the filtered data to a buffer 109 which is accessible also by the DMA engine 80.

If the mode decision made by the host processor 90 is to intra-block encode a given macroblock, the CALC engine 106 reads the intra mode and performs intra prediction for the mode for which it has been programmed. The CALC engine 106 computes the difference between intra-predicted pixels and current pixels and produces the residuals. The residuals will be transformed, quantized, and saved into buffer 113. As noted above, quantization is a lossy process and thus the CALC engine will produce a reconstructed set of pixels by performing inverse quantization and inverse transformation. The CALC engine 106 will then save the reconstructed pixels into buffer 111. The reconstructed pixels will be filtered by the loop filter 112 based on the boundary strengths provided by the boundary strength estimator 110. The loop filter 112 saves the filtered data to buffer 109 at the end for the DMA engine 80 to store in external memory.

The entropy encoder 108 receives the transformed quantized residuals, and applies a suitable coding technique. For example, the entropy encoder 108 may apply one of context adaptive binary arithmetic coding and context adaptive variable length coding to produce an entropy encoded macroblock.

The entropy encoder 108 and the boundary strength estimator 110 share and communicate with each other by way of macroblock data buffer (MBDATBUF) 121. The entropy encoder stores a data set in the MBDATBUF 121 that defines a corresponding macroblock. The boundary strength estimator 110 reads the macroblock data set of each macroblock and assigns strength values to the edges of blocks within the macroblock. For example, the boundary strength estimator 110 may apply strength values to the edges of 4×4 or 8×8 blocks of each macroblock. The strength values may be determined based on, for example, inter-block luminance gradient, size of applied quantization step, and difference in applied coding.

The loop filter 112 receives the strength values provided from the boundary strength estimator 110 and filters the block edges in accordance with the boundary strength values. Each filtered macroblock may be stored for use by the motion estimator 102 and the motion compensator 104 in inter-prediction.

The MEMO buffer 120 preferably is operated in a "four buffer mode." Four buffer mode means the MEMO buffer 120 is accessed as four pages. Each page may comprise any desired size such as 8 Kbytes. Each page can be accessed by a different master than the other pages. Thus, the ME 102 can access one page of the MEMO buffer 120, while the MC 104 and DMA engine 80 access other pages of the buffer.

Figure 2:
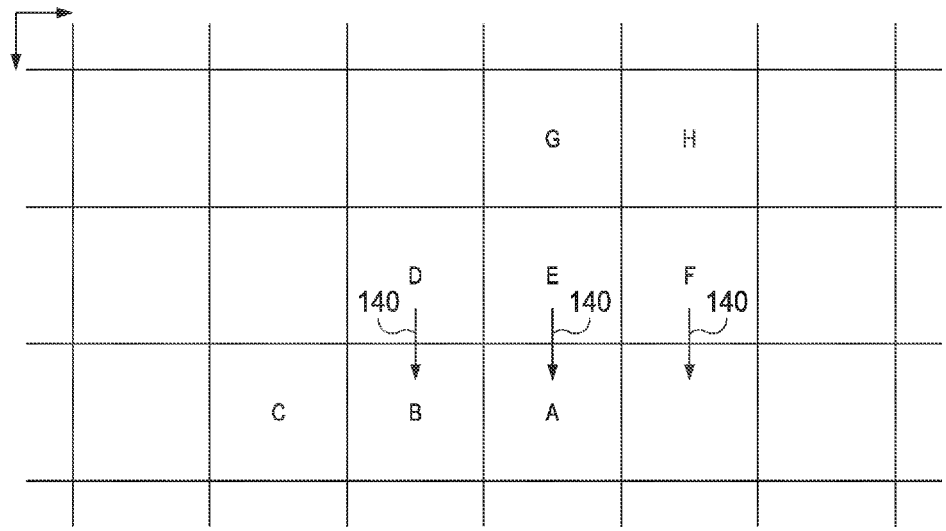
FIG. 2 illustrates the use of adjacent macroblocks to determine predicted motion vectors in accordance with various embodiments.

FIG. 2 illustrates various macroblocks in a given video frame. As indicated by the arrows in FIG. 2, the encoding of the macroblocks generally progresses from the top-left corner of the video frame to the right along the first row of macroblocks, then to the left side of the second row of macroblocks and from left to the right along the second row, and so on.

A number of functions are performed for each macroblock. One such function is the computation of a predicted motion vector (PMV) which is a predictor of the motion of the image depicted in the pixels comprising each such macroblock. Computing PMVs is performed at two places in the encoding pipeline of FIG. 1. The motion estimator 102 determines motion vectors and the entropy encoder 108 also determines motion vectors.

The entropy encoder 108 computes a PMV for a given macroblock based preferably on three nearby-macroblocks. Referring to FIG. 2, the PMV for macroblock E may be computed by the entropy encoder 108 based on the motion vector of left macroblock D, the motion vector of the top macroblock G and the motion vector of the top-right macroblock H. The actual motion vectors were previously computed by the motion estimator 102. In some embodiments, the computation by the entropy encoder of the PMV is the median of the motion vectors of the left, top, and top-right macroblocks, but can be computed with operations other than the median in other embodiments.

The architecture depicted in FIG. 1 is based on a pipeline approach. That is, the motion estimator 102 operates on macroblocks earlier in the pipeline than the entropy encoder 108. As such, it is possible that the motion vector for the left macroblock for a given macroblock has not yet been retrieved from memory and available for use in PMV computations by the motion estimator. For example, to compute the PMV by the motion estimator 102 for macroblock A in FIG. 2, the motion vector for left macroblock B may not yet be available. By the time the entropy encoder is to compute a PMV for macroblock A, the motion vector for left macroblock B will be ready and thus can be used by the encoder. The motion estimator 102 might solve this pipeline timing problem by using the left-left macroblock C (instead of left macroblock B) when computing the PMV for macroblock A, in addition to top macroblock E and top-right macroblock F. While functionally acceptable, nevertheless computation of a PMV is computationally intensive.

In accordance with various embodiments of the invention, therefore, the motion estimator does not actually compute a PMV for a given macroblock and instead uses the PMV computed by the entropy encoder 108 for the top macroblock. For macroblock A, for example, the motion estimator 102 uses the PMV for macroblock E computed by the entropy encoder 108. As explained above, the PMV for macroblock E was previously computed by the entropy encoder 108 based on nearby macroblocks D, G, and H. Arrows 140 in FIG. 2 depict the reuse of the PMVs for macroblocks in the next row.

By using/re-using a PMV already computed by the encoder 108 and not separately performing a computation for PMVs, the motion estimator 102 avoids the computationally intensive process incurred by the entropy encoder, thereby improving performance of the video encoder 100. Very little cycle penalty is incurred by the motion estimator because the PMV of the top macroblock has already been computed. The only cycle penalty, which is small, in incurred in storing the PMVs by the entropy encoder in, for example, the auxiliary buffer 125 and/or memory 91 and fetching the PMVs at the appropriate time for use by the motion estimator 102.

Figure 3:
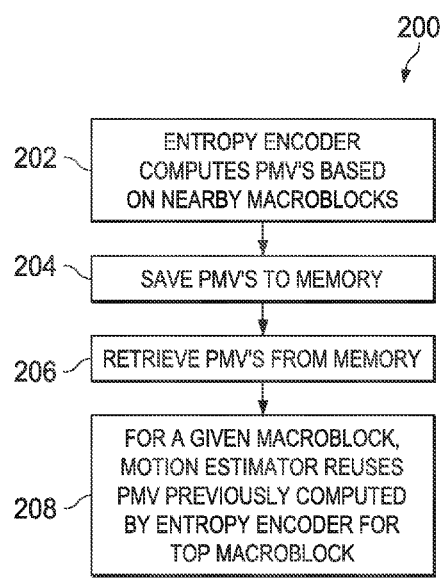
FIG. 3 shows a method in accordance with various embodiments.

FIG. 3 illustrates a corresponding method 200. At 202, the entropy encoder 108 computes PMVs for each macroblock based on motion vectors of nearby macroblocks (e.g., left, top, and top-right macroblocks). At 204, the PMVs are saved to memory, and at 206 the PMVs are retrieved. At 208, for a given macroblock, the motion estimator 102 reuses the PMVs previously computed by the encoder for top macroblocks.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A video encoder, comprising:
an entropy encoder that receives transformed and quanitized residuals of each of a plurality of macroblocks, entropy encodes each macroblock and computes an initial predicted motion vector (PMV) for each macroblock in a video frame based on motion vectors of multiple other macroblocks prior to a current macroblock in encoding order;
a buffer and/or memory storing the computed initial predicted motion vectors of the video frame; and
a motion estimator that determines a predicted motion vector for a given macroblock by reusing, as the predicted motion vector for the given macroblock, only the initial PMV computed by the entropy encoder for a macroblock immediately on top of the given macroblock stored in the buffer and/or memory.

2. The video encoder of claim 1 wherein the encoder computes a PMV for each macroblock based on three other macroblocks.

3. The video encoder of claim 2 wherein the three other macroblocks include a left macroblock, a top macroblock and a top-right macroblock.

4. A method, comprising:
entropy encoding, by an entropy encoder, transformed and quanitized residuals of each of a plurality of macroblocks, and computing an initial predicted motion vector (PMV) for each macroblock in a video frame based on motion vectors of multiple other macroblocks prior to a current macroblock in encoding order; and
storing, by a buffer and/or memory, the computed initial predicted motion vectors of the video frame; and
determining, by a motion estimator, a predicted vector for a given macroblock by reusing, as the predicted motion vector for the given macroblock, only the initial PMV computed by the entropy encoder for a macroblock immediately on top of the given macroblock stored in the buffer and/or memory.

5. The method of claim 4 wherein computing the PMV by the encoder comprises computing a PMV for each macroblock based on three other macroblocks.

6. The method of claim 5 wherein the three other macroblocks include a left macroblock, a top macroblock and a top-right macroblock.

* * * * *